United States Patent [19]

Okada et al.

[11] 4,451,848
[45] May 29, 1984

[54] TELEVISION RECEIVER INCLUDING A CIRCUIT FOR DOUBLING LINE SCANNING FREQUENCY

[75] Inventors: Takashi Okada; Yutaka Tanaka, both of Yokohama, Japan

[73] Assignee: Sony Corporation, Tokyo, Japan

[21] Appl. No.: 330,944

[22] Filed: Dec. 15, 1981

[30] Foreign Application Priority Data

Dec. 26, 1980 [JP] Japan .................. 55-189300

[51] Int. Cl.$^3$ ................. H04N 3/27; H04N 5/02
[52] U.S. Cl. ...................... 358/140; 358/147
[58] Field of Search ............. 358/11, 140, 152, 147; 340/728, 748, 749, 750

[56] References Cited

U.S. PATENT DOCUMENTS 3,806,644 4/1974 Browne et al. .................. 358/140
4,322,750 3/1982 Lord et al. ....................... 358/140

Primary Examiner—Joseph A. Orsino, Jr.
Attorney, Agent, or Firm—Hill, Van Santen, Steadman & Simpson

[57] ABSTRACT

A television receiver according to the present invention includes a circuit for doubling line scanning frequency, receives character information signals of frame rate, and in which scanning lines of even fields coincide with those of odd fields. The television receiver is so designed that the scanning of the lines of the odd fields are substantially delayed by H/2 (H; normal horizontal scanning period). Therefore, an excellent picture image can be obtained without flickering and degradation in resolution.

1 Claim, 4 Drawing Figures

TELEVISION RECEIVER INCLUDING A CIRCUIT FOR DOUBLING LINE SCANNING FREQUENCY

BACKGROUND OF THE INVENTION

1. Field of the Invention

The present invention relates to a televeision receiver including a circuit for doubling the line scanning frequency which displays at high resolution characters transmitted in a character information transmission system such as character broadcasting.

2. Description of the Prior Art:

Much develpment and some application has been made of character broadcasting in which digital signals (to be referred to as character signals hereinafter) derived from the character information are inserted in a predetermined horizontal scanning linewidth in the vertical blanking interval of the television video signals. A double scanning televison receiver is also conventionally known in which the number of scanning lines per field of the screen is doubled to improve the apparent resolution. Double scanning is generally performed in the manner to be described below. FIG. 1 shows a television screen during normal interlaced scanning. FIG. 2 shows a television screen during double scanning which does not involve interlaced scanning. Referring to FIG. 1, scanning lines ①, ③, ..., ⑨ indicated by solid lines correspond to odd fields, and scanning lines ②, ④, ..., ⑨' indicated by dotted lines correspond to even fields. For performing double scanning without interlaced scanning, the scanning lines of the odd fields and the even fields coincide as shown in FIG. 2. The scanning lines ① and ⑨' are scanned on the same line, and the scanning lines ① and ② are scanned on the same line. The scanning lines ③ and ②, the scanning lines ③ and ④, and so on are scanned on the same lines, respectively, in the order mentioned. By the way in a conventional character broadcasting system character information signals are transmitted at frame rate, that is, a character signal of an odd field is completely the same as that of a succeeding even field. Therefore it can be assumed that one spot is produced on the normal screen shown in FIG. 1 by a spot 1a produced by the scanning line ③ and a spot 1b produced by the scanning line ④. If this screen is double-scanned in this order, one spot is produced by three spots 1a, 1b, (=1a'), and 1b' of the three scanning lines as shown in FIG. 2. Therefore, the single spot which is produced on the double-scanned screen is 1.5 times longer in the vertical direction than the spot which is displayed on the normal screen. The vertical resolution is thus degraded in the double scanning. In a television receiver for receiving character broadcasting as described above, more flickering is observed on the character screen during reception character broadcasting than on the screen during reception of normal broadcasting. It has been proposed to adopt the double scanning system as described above to overcome this problem. However, since the character screen involves more abrupt changes in the vertical direction, the degraded vertical resolution significantly adversely affects the picture quality.

OBJECTS AND SUMMARY OF THE INVENTION

Accordingly, it is an object of this invention to provide an improved television receiver including a circuit for doubling the line scanning frequency which displays with high resolution characters transmitted in a character information transmission system such as character broadcasting.

It is another object of this invention to provide an improved television receiver including a circuit for doubling the line scanning frequency in which flickering is eliminated on the character screen during the reception of character broadcasting.

In accordance with an aspect of this invention, there is provided a television receiver including a circuit for doubling the line scanning frequency and receiving character information signals at the frame rate, wherein scanning lines of even fields coincide with scanning lines of odd fields; the improvement in which the scanning of the lines of said odd fields are substantially delayed by H/2 (H; normal horizontal scanning period).

The above and other objects, features and advantages of this invention will become apparent from the ensuing description of illustrative embodiments thereof, which is to be read in conjunction with the accompaying drawings.

DETAILED DESCRIPTION OF PREFERRED EMBODIMENTS

Figure 1:
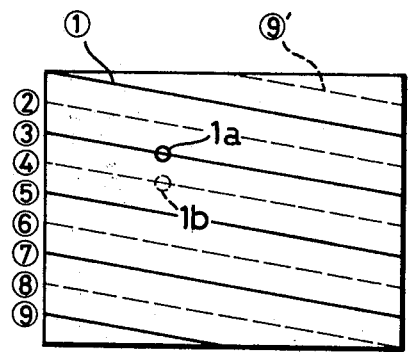
FIG. 1 is a view showing the scanning lines of a normal television screen.
Figure 2:
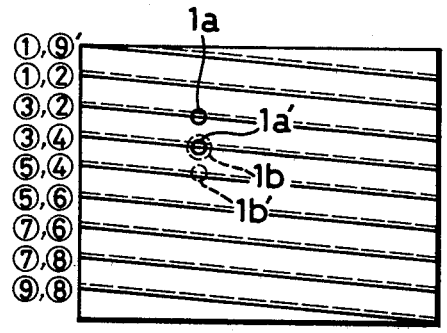
FIG. 2 is a view showing the scanning lines of a television screen according to conventional double scanning.
Figure 3:
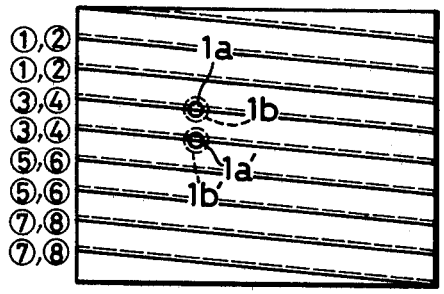
FIG. 3 is a view showing the scanning lines of a television screen for explaining the principle of the present invention.

FIG. 3 shows the principle of double scanning according to the present invention, wherein the scanning lines ①, ③, ..., ⑨ of the odd fields shown in FIG. 2 are shifted downward by one scanning linewidth. Referring to FIG. 3, the scanning lines ① and ② are scanned on the same line twice. The scanning lines ③ and ④ are scanned on the same line twice. The scanning lines ⑤ and ⑥ are scanned on the same scanning line twice and so on. According to this method, the spots 1a and 1b produced by the two scanning lines shown in FIG. 1 are also produced by the spots 1a (=1a') and 1b (=1b') in FIG. 3. Therefore, the vertical resolution is not degrade.

Figure 4:
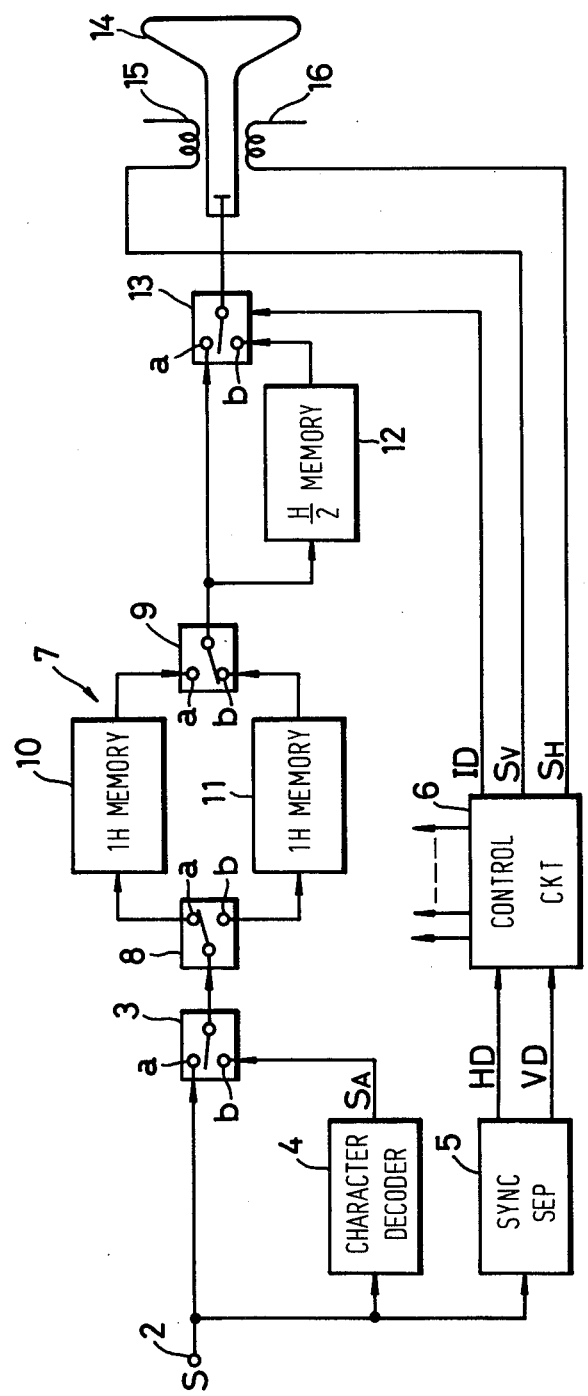
FIG. 4 is a circuit diagram according to an example of the present invention.

FIG. 4 shows an example of the circuit configuration of a receiver for realizing this principle.

Referring to FIG. 4, a video signal S is supplied to an input terminal 2 from a video detector of the preceding stage. The video signal S is then applied to a contact a of a switch circuit 3, a character decoder 4, and a synchronizing separator circuit 5. The movable contact of the switch circuit 3 is switched to the contact a during reception of normal television broadcasting and is switched to a contact b during reception of character broadcasting. The character decoder 4 extracts the character signal from the video signal S and decodes it into an analog character signal $S_A$ which is supplied to the contact b of the switch circuit 3. The synchronizing seperator circuit 5 extracts a horizontal synchronizing signal HD and a vertical synchronizing signal VD from the video signal S and supplies them to a control circuit 6. The signal S or the signal $S_A$ selected by the switch circuit 3 is supplied to a double scanning converting circuit 7. The double scanning converting circuit 7 consists of switch circuits 8 and 9 and 1H memories 10 and 11. The switch circuit 8 is switched between contacts a and b at every 1H to alternately supply the input signal to the memories 10 and 11. The memories 10 and 11 may comprise BBDs or CCDs which write input signals at a speed of 1H and read out the written signals at double speed, that is, H/2. These memories 10 and 11 are so constructed that one of them writes the input signals while the other reads out the written signals twice. The switch 9 is switched between contacts a and b at every 1H in the opposite direction of the switching of the switch circuit 8, to supply the signals alternately read out from the memories 10 and 11, to a contact a of a switch circuit 13 and a H/2 memory 12. Based on the horizontal and vertical synchronizing signals HD and VD, the control circuit 6 produces an identification signal ID for identifying the odd fields from the even fields, a vertical deflection voltage $S_V$, a horizontal deflection voltage $S_H$ of double scanning frequency $2f_H$ (where $f_H$ is a horizontal scanning frequency, for example, 15.75 kHz), and so on. The identification signal ID goes level "1" (high level) at an odd field and goes level "0" (low level) at an even field. This signal ID is for switching the switch circuit 13 at every field. The vertical deflection voltage $S_V$ is applied to a vertical deflection coil 15 of a cathode-ray tube 14, while the horizontal deflection voltage $S_H$ is applied to a horizontal deflection coil 16. The control circuit 6 also produces writing and readout clocks for the memories 10, 11 and 12 and switching signals for the switch circuits 8 and 9. The memories 10, 11 and 12 may, for example, comprise 910-bit memories. In this case, the frequency of the writing clocks is, for example, 14 MHz and the frequency of the readout clocks is, for example, 28 MHz. The switch circuit 13 is switched to the contact a when the signal ID is at level "0", that is, at the even field and during the reception of normal television broadcasting. The switch circuit 13 is switched to the contact b when the signal ID is at level "1", that is, at the odd field.

With the television receiver of the construction as described above, during the reception of character broadcasting, the signal $S_A$ obtained from the character decoder 4 is supplied to the double scanning converting circuit 7 and is converted to the a double scanning frequency signal as described above. Therefore, a signal with the same H interval as the signal $S_A$ is obtained from the switch circuit 9 twice every H/2. If this signal corresponds to the even field, it is directly supplied to the cathode-ray tube 14 through the contact a of the switch circuit 13. If this signal corresponds to the odd field, it is delayed in the H/2 memory 12 for a period of H/2 and is then supplied to the cathode-ray tube 14 through the contact b of the switch circuit 13. Since the horizontal deflection coil 16 of the cathode-ray tube 14 is driven by the horizontal deflection voltage $S_H$ at a double scanning frequency $2f_H$, double scanning is performed and the scanning lines of the odd fields are delayed by H/2 as shown in FIG. 3.

During the reception of normal television broadcasting, the switch circuit 13 is switched to the contact a, and the video signal converted to a signal of double scanning frequency is directly supplied to the cathode-ray tube 14. The switching of the switch circuit 13 at every field may also be performed during the reception of normal television broadcasting.

For performing scanning as shown in FIG. 3, the scanning lines ①, ③, ..., ⑨ of the odd fields shown in FIG. 2 need only be shifted downward by one scanning linewidth, or the scanning lines ②, ④, ..., ⑨' of the even fields need only be shifted upward by the same linewidth. As an alternative way to the method shown in the circuit of FIG. 4, it is also possible to shift the scanning lines by varying the level of the vertical deflection voltage $S_V$ for odd or even fields according to the scanning linewidth.

The present invention has been described with reference to the case where it is applied to character broadcasting. However, the present invention is also applicable to a system which transmits character information utilizing a telephone circuit or other character information transmission systems.

It is also to be understood that this invention is not limited to those precise embodiments, and that various changes and modifications may be effected therein by one skilled in the art without departing from the scope or spirit of the invention as defined in the appended claims.

What is claimed is:

1. A television receiver comprising: an input terminal for receiving first video signals which include character information signals during vertical blanking periods where a character signal of an odd interlaced field is identical with a character signal of a succeeding even field; a character decoder connected to said input terminal for detecting said information signals and converting the same to second video signals, first switching means connected to said input terminal and said character decoder for switchably selecting one of said first and second video signals, a scanning converter connected to said first switching means for doubling the frequency of the selected video signals, a display means, means for supplying said frequency doubled video signals to said display means for a visual display, including field identification means connected to said input terminal for detecting odd fields from even fields, and control means connected to said field identification means and said display means for controlling the scanning of said display means such that the scanning of the lines of said odd fields are substantially delayed by H/2 where H is the normal horizontal scanning period with respect to those of said even fields, and wherein said means for supplying said frequency doubled video signals includes a delay circuit of H/2 connected to said scanning converter and second switching means for switchably supplying one of the input and output signals of said delay circuit to said display means and wherein said control means controls said second switching means and wherein an interlaced signal is converted to a non-interlaced signal and wherein corresponding lines of the even and odd fields beginning with the first line in each field are superimposed and each such superimposed line is scanned twice on said display means.

* * * * *